United States Patent
Spedaliere et al.

(10) Patent No.: US 9,420,628 B2
(45) Date of Patent: Aug. 16, 2016

(54) VIRTUALIZED WIRELESS NETWORK WITH PILOT BEACONS

(71) Applicant: Dali Systems Co. Ltd., George Town, Grand Cayman, KY (US)

(72) Inventors: Gary Spedaliere, Palo Alto, CA (US); Albert S. Lee, Palo Alto, CA (US); Shawn Patrick Stapleton, Palo Alto, CA (US)

(73) Assignee: Dali Systems Co. Ltd., George Town, Grand Cayman (KY)

( * ) Notice: Subject to any disclaimer, the term of this patent is extended or adjusted under 35 U.S.C. 154(b) by 37 days.

(21) Appl. No.: 13/671,203

(22) Filed: Nov. 7, 2012

(65) Prior Publication Data

US 2013/0114486 A1    May 9, 2013

Related U.S. Application Data

(60) Provisional application No. 61/556,725, filed on Nov. 7, 2011.

(51) Int. Cl.
*H04B 10/27* (2013.01)
*H04W 88/08* (2009.01)
*H04J 14/00* (2006.01)
(Continued)

(52) U.S. Cl.
CPC .............. *H04W 84/10* (2013.01); *H04B 10/27* (2013.01); *H04J 14/00* (2013.01); *H04W 52/02* (2013.01); *H04W 52/0206* (2013.01);
(Continued)

(58) Field of Classification Search
CPC .......... H04B 1/18; H04B 1/40; H04B 7/0413; H04B 1/0475; H04B 7/024; H04B 10/27; H03F 1/3247; H03F 2200/336; H03F 2200/57; H03F 2201/3224; H03F 2201/3233; H03F 3/24; H04L 25/03343; H04L 27/362; H04L 5/0007; H04J 14/00; H04W 88/085; H04W 88/08; H04W 52/02
USPC ........................... 370/254–350; 709/201–213
See application file for complete search history.

(56) References Cited

U.S. PATENT DOCUMENTS 6,075,989 A * 6/2000 Moore et al. ................... 455/436
6,161,024 A    12/2000 Komara
(Continued)

FOREIGN PATENT DOCUMENTS

WO       96/27269 A1    9/1996
WO    2010/091004 A1    8/2010
(Continued)

OTHER PUBLICATIONS

International Search Report and Written Opinion of the International Searching Authority for corresponding International application No. PCT/US2012/063720 mailed on Jan. 29, 2013, 8 pages.

*Primary Examiner* — Ayaz Sheikh
*Assistant Examiner* — Debebe Asefa
(74) *Attorney, Agent, or Firm* — Kilpatrick Townsend & Stockton LLP

(57) ABSTRACT

A virtualized DAS network includes one or more digital access units (DAUs) and one or more digital remote units (DRUs) coupled to the one or more DAUs. The virtualized DS network also includes a routing table associated with the one or more DAUs. A signal provided by the one or more DRUs includes one or more carriers and one or more pilot beacons.

17 Claims, 8 Drawing Sheets

(51) Int. Cl.
*H04W 84/10* (2009.01)
*H04W 52/02* (2009.01)

(52) U.S. Cl.
CPC ........... *H04W 88/08* (2013.01); *H04W 88/085* (2013.01); *Y02B 60/50* (2013.01)

(56) References Cited

U.S. PATENT DOCUMENTS

| | | | |
|---|---|---|---|
| 7,565,170 B2 | 7/2009 | Buscaglia et al. | |
| 7,664,534 B1 | 2/2010 | Johnson | |
| 8,355,313 B2* | 1/2013 | Walton et al. | 370/208 |
| 8,583,100 B2 | 11/2013 | Koziy et al. | |
| 8,682,338 B2* | 3/2014 | Lemson et al. | 455/453 |
| 8,737,300 B2* | 5/2014 | Stapleton et al. | 370/328 |
| 9,026,036 B2* | 5/2015 | Saban et al. | 455/7 |
| 2002/0186436 A1 | 12/2002 | Mani et al. | |
| 2003/0078052 A1 | 4/2003 | Atias et al. | |
| 2004/0004943 A1 | 1/2004 | Kim et al. | |
| 2004/0132474 A1* | 7/2004 | Wala | 455/517 |
| 2005/0088992 A1 | 4/2005 | Bolin et al. | |
| 2006/0089165 A1* | 4/2006 | Smith et al. | 455/466 |
| 2008/0119198 A1 | 5/2008 | Hettstedt et al. | |
| 2009/0180426 A1 | 7/2009 | Sabat et al. | |
| 2009/0258652 A1* | 10/2009 | Lambert et al. | 455/446 |
| 2010/0278530 A1 | 11/2010 | Kummetz et al. | |
| 2011/0158332 A1 | 6/2011 | Wu et al. | |
| 2012/0071184 A1 | 3/2012 | Lin | |
| 2012/0189074 A1 | 7/2012 | Jin et al. | |
| 2012/0257516 A1 | 10/2012 | Pazhyannur et al. | |
| 2013/0128810 A1 | 5/2013 | Lee et al. | |
| 2013/0150063 A1 | 6/2013 | Berlin et al. | |

FOREIGN PATENT DOCUMENTS

| | | |
|---|---|---|
| WO | 2010/139112 A1 | 12/2010 |
| WO | 2013/070613 A1 | 5/2013 |

* cited by examiner

VIRTUALIZED WIRELESS NETWORK WITH PILOT BEACONS

CROSS-REFERENCES TO RELATED APPLICATIONS

This application claims priority to U.S. Provisional Patent Application No. 61/556,725, filed on Nov. 7, 2011, titled "Virtualized Wireless Network With Pilot Beacons," the disclosure of which is hereby incorporated by reference in its entirety for all purposes.

BACKGROUND OF THE INVENTION

In a conventional Distributed Antenna System (DAS), a base station RF output may be fed through a Point of Interconnect (POI). The POI may provide any combining and attenuation as required. From the POI, a connection may be made to a host, which converts the RF to an optical signal. The optical signal is fed directly via optical fiber to any outdoor remotes or indoor remotes, possibly requiring an expansion unit. All of the remotes may retransmit the entire base station output all of the time. There is no intelligence involved in the system. The system may involve multiple operators but all signals are combined at the POI in the analog domain. Without more signal processing, the DAS may consume power inefficiently, provide excessive paging signals, and may experience some self-interference between cellular broadcast type systems. Thus, it may be desirable to find methods and apparatuses that can improve in these areas.

SUMMARY OF THE INVENTION

The aforementioned problems and others may be solved according to embodiments of the present invention. The present invention relates to wireless communications systems. More particularly, embodiments of the present invention relate to methods and systems for a virtualized wireless network with pilot beacon optimization.

According to an embodiment of the present invention, a packet data based fiber optic distributed antenna system that incorporates software configurable radios, carrier specific transmission, and/or pilot beacons to optimize virtual DAS networks is provided. The implementations described herein provide a flexible DAS system that is able to direct specific data packets to specific Digital Remote Units (DRU) on a time varying basis.

According to an embodiment of the present invention, a virtualized DAS network is provided. The virtualized DAS network includes one or more digital access units (DAUs) and one or more digital remote units (DRUs) coupled to the one or more DAUs. The virtualized DAS network also includes a routing table associated with the one or more DAUs. A signal provided by the one or more DRUs includes one or more carriers and one or more pilot beacons.

According to another embodiment of the present invention, a method of operating a virtualized DAS network is provided. The method includes receiving, at a DAU, a first set of carriers from a first operator and transmitting at least one carrier of the first set of carriers from the DAU to a DRU. The method also includes transmitting the at least one carrier of the first set of carriers from the DRU to a mobile device and transmitting a pilot beacon from the DRU to the mobile device.

DETAILED DESCRIPTION OF THE INVENTION

Figure 1:
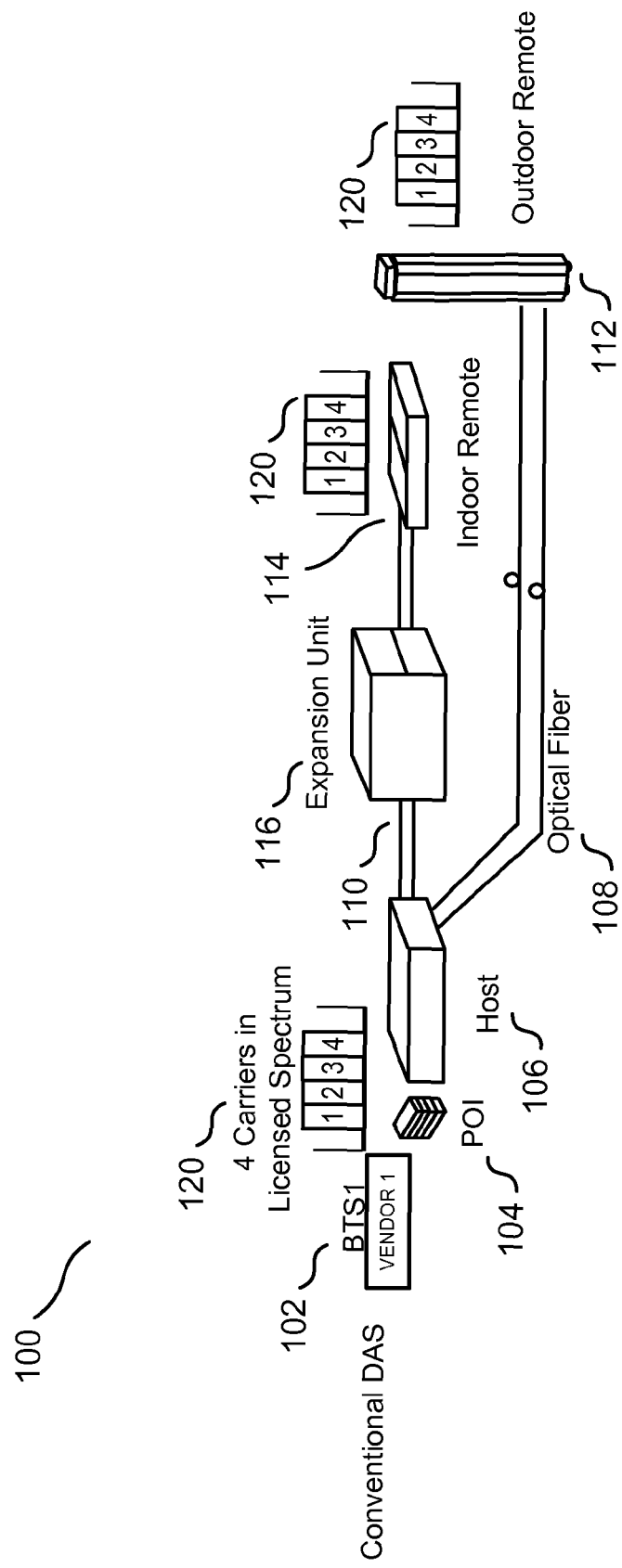
FIG. 1 illustrates a conventional DAS system.

Embodiments of the present invention relate to wireless communications systems. More particularly, embodiments of the present invention relate to methods and systems for a virtualized wireless network with pilot beacon optimization.

According to embodiments of the present invention, methods and systems are provided for reducing total power consumption, optimizing resource utilization, and increasing capacity by balancing the number of carriers in use against real time traffic demands in a Distributed Antenna System (DAS). As described herein, embodiments of the present invention utilize a DAS substituting pilot, paging and sync (PPS) signals at selected Digital Remote Units (DRU) in a DAS to provide a number of benefits. These benefits include reducing the total power requirements of the system by limiting the pilot paging and sync signals to less than 20% of a fully loaded carrier in some embodiments. Benefits also include reducing the self-interference inherent in cellular broadcast type systems such as CDMA, WCDMA, or LTE by limiting the number of fully powered carriers transmitted. Additionally, benefits include maintaining the soft handoff feature of the CDMA, WCDMA, or LTE wireless systems and increasing the capacity of the DAS system.

The improvements and benefits provided by embodiments of the present invention provide an energy efficient or green solution in that the total power drawn from the grid by the DAS infrastructure is significantly reduced. As well, improved reception from the handsets gives a longer battery life and less frequent charging.

Pilot beacons include pilot paging and sync (PPS) signals that form part of a carrier in broadcast type systems such as CDMA, WCDMA or LTE. These systems can be compared to "channelized" systems such as GSM, where each carrier is separate and independent and the signal carriers do not have to be simultaneously broadcast in various cells at the same time. The PPS signal generally makes up 10 to 20 percent of the total RF energy of a carrier. The remainder of the energy in a carrier is used for voice or data channel information. These percentages are generally defined in the data fill (set up) at the base station or eNodeB. The power is defined as a percentage of total power available per carrier as the power per carrier will change depending on modulation technology, footprint and individual base station.

Products provided by embodiments of the present invention include a software configurable radio that uses self-generated pilot beacons or third party pilot beacons as part of its capacity optimization in the virtualization of wireless networks. Distributed Antenna Systems provided by embodiments of the present invention feature an all-digital transport system that enable both broadband wireless transmission and channel or carrier specific transmission over fiber, copper, microwave, or the like. The DAS uses proprietary digitization of analog RF signals and converts these signals to I/Q signals for transmission as part of a packet data bit stream. The digital DAS system also enables identification and transmission of individual carriers and channels.

The methods described herein are equally applicable to channelized systems (GSM) through control of individual channels, as disclosed in U.S. patent application Ser. No. 13/211,243 (DW-1023), filed on Aug. 16, 2011, and titled "Remotely Reconfigurable Distributed Antenna System and Methods," the disclosure of which is hereby incorporated by reference in its entirety.

FIG. 1 illustrates a conventional DAS system 100. In this system 100, all of the available carriers within the assigned spectrum are fed from the base station 102 as RF and distributed to the remotes via fiber. The remotes retransmit the complete spectrum from the base station. The base station RF output is fed through a Point of Interconnect (POI) 104. The POI 104 provides any combining and attenuation as required. From the POI 104, a connection is made to the host 106, which converts the RF to an optical signal. The optical signal is fed directly via optical fiber 108 and 110 to the outdoor remote 112 or indoor remotes 114, possibly requiring an expansion unit 116. All of the remotes retransmit the entire base station output 120 all of the time. There is no intelligence involved in the system. The system may involve multiple operators and multiple base stations but all signals are combined at the POI in the analog domain.

The number of carriers is arbitrary and shown for illustrative purposes only. Typically, the number of carriers per operator will range between 2 and 11 in a single licensed band depending on the technology used.

Figure 2:
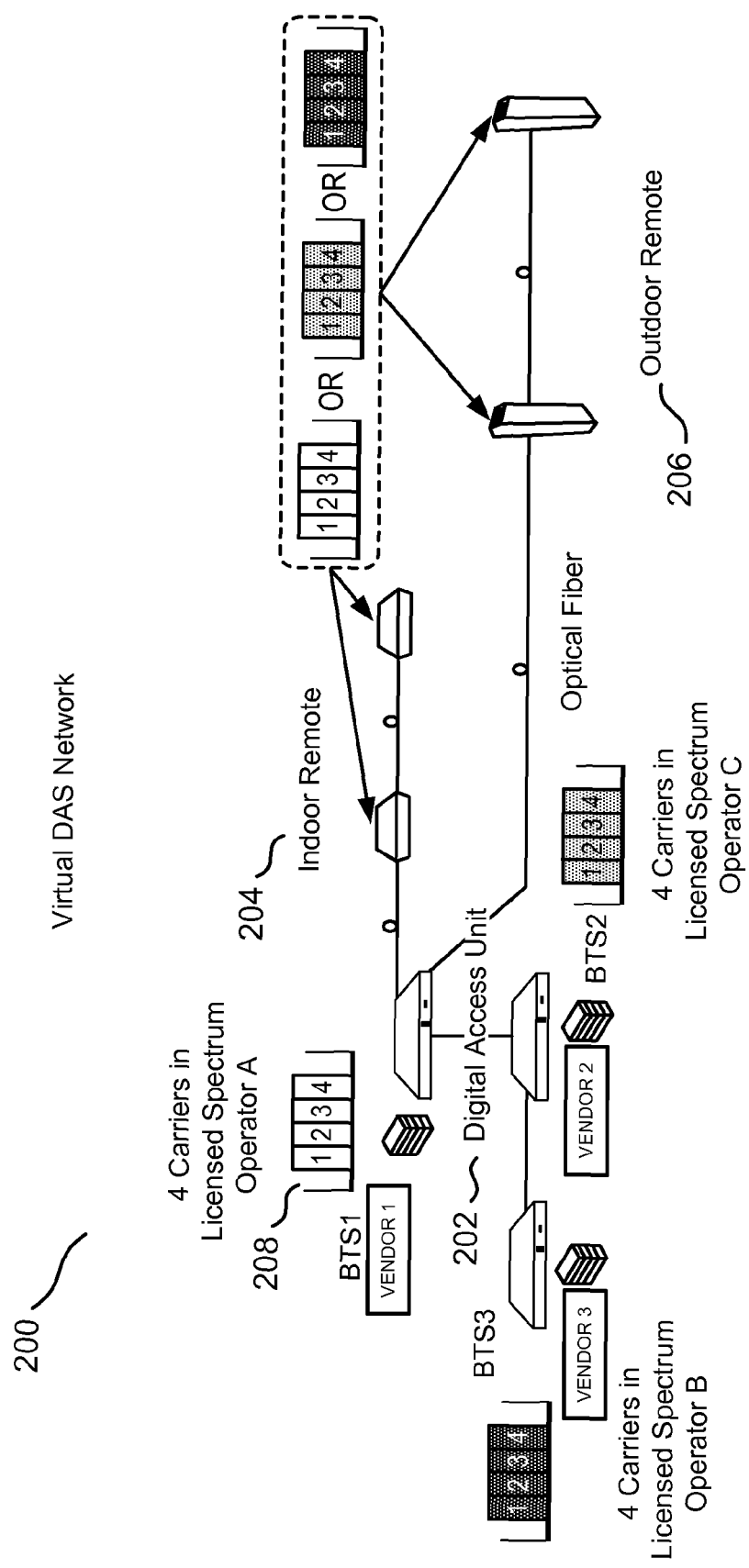
FIG. 2 is a simplified schematic diagram illustrating a virtualized DAS network according to an embodiment of the present invention.

FIG. 2 is a simplified schematic diagram illustrating a virtualized DAS network 200 according to an embodiment of the present invention. Referring to FIG. 2, all of the base stations, possibly from multiple vendors, e.g. vendor 1, vendor 2, and vendor 3, can be located at a base station hotel or farm. Each base station is fed into an individual Digital Access Unit (DAU) 202—equivalent to a host in FIG. 1—eliminating any analog domain RF combining with the attendant losses and intermodulation distortion. Multiple DAUs may be interconnected. The incoming signals are converted to packet data I/Q signals in the DAU(s) 202 and the DAUs 202 are daisy chained in the illustrated embodiment. A single master DAU feeds the signals over an optical fiber to both outdoor and indoor DRUs 206 and 204, respectively. The DAS system shown in FIG. 2 also allows all DAUs to act as feed points but this option is not shown for the purposes of clarity.

As will be evident to one of skill in the art, the individual operators all have their own licensed spectrum. This could also be a single operator with multiple licensed bands in different frequency spectrum.

The DAS systems provided by embodiments of the present invention can identify and route the individual base station inputs and as described more fully below, this gives the flexibility of directing any of the inputs to any of the outputs. The packets can be sent to a specific DRU or multiple DRUs. Thus, embodiments of the present invention provide a true virtual DAS network.

Figure 3:
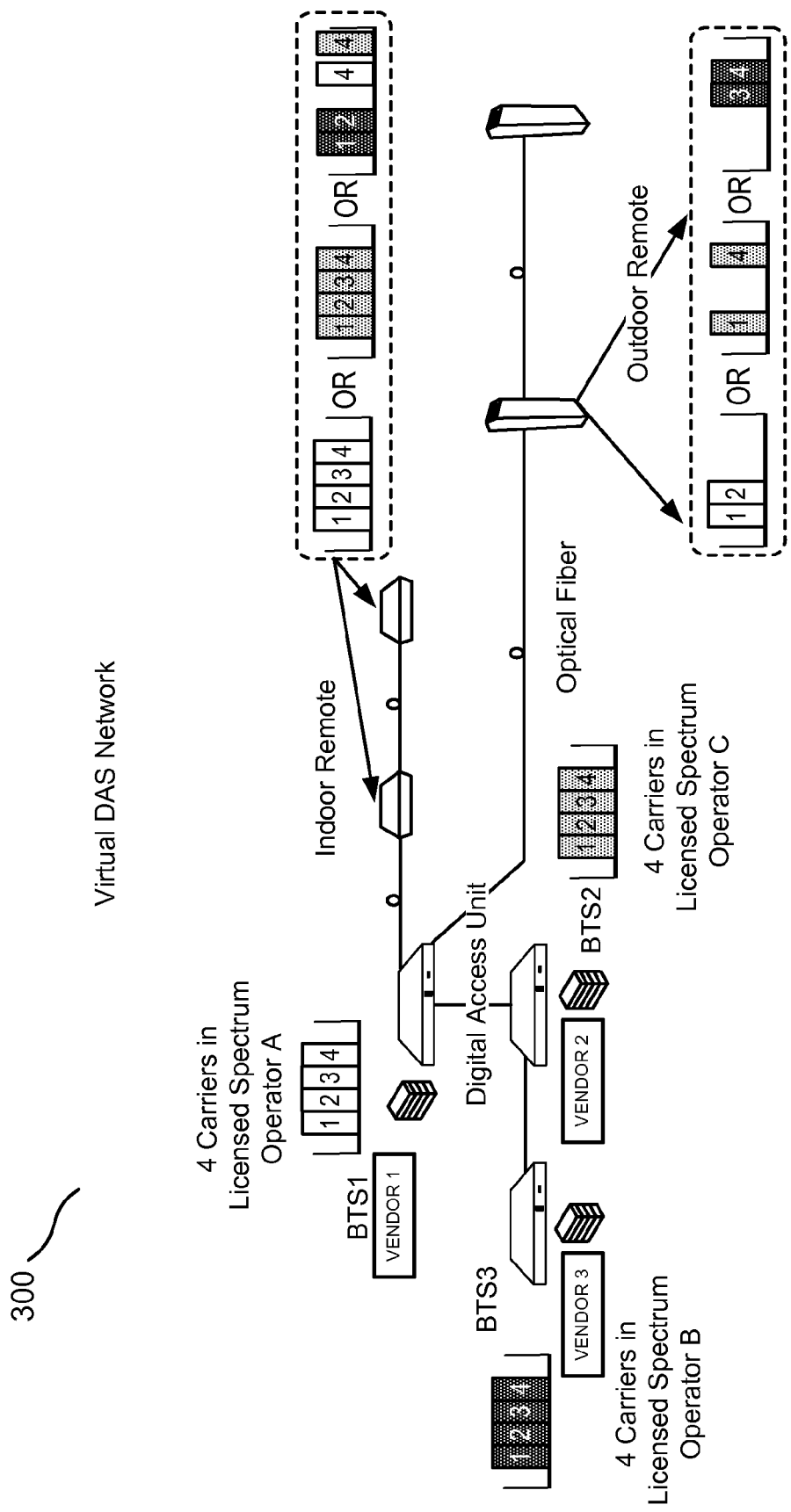
FIG. 3 is a simplified schematic diagram illustrating a virtual DAS network including routing of individual carriers to predetermined remote units according to an embodiment of the present invention.

When the DAS system 200 illustrated in FIG. 2 is identifying individual carriers or channels 208 in the DAU, the DAS system can further control transmission of specific carriers. This ability to identify and route individual carriers is a benefit provided by the pilot beacon virtual network technology described herein. FIG. 3 is a simplified schematic diagram illustrating a virtual DAS network 300 including routing of individual carriers to predetermined remote units according to an embodiment of the present invention. Referring to FIG. 3, all of the carriers associated with a given operator, or a subset of the operators' carriers, can be routed to the remote units.

Figure 4:
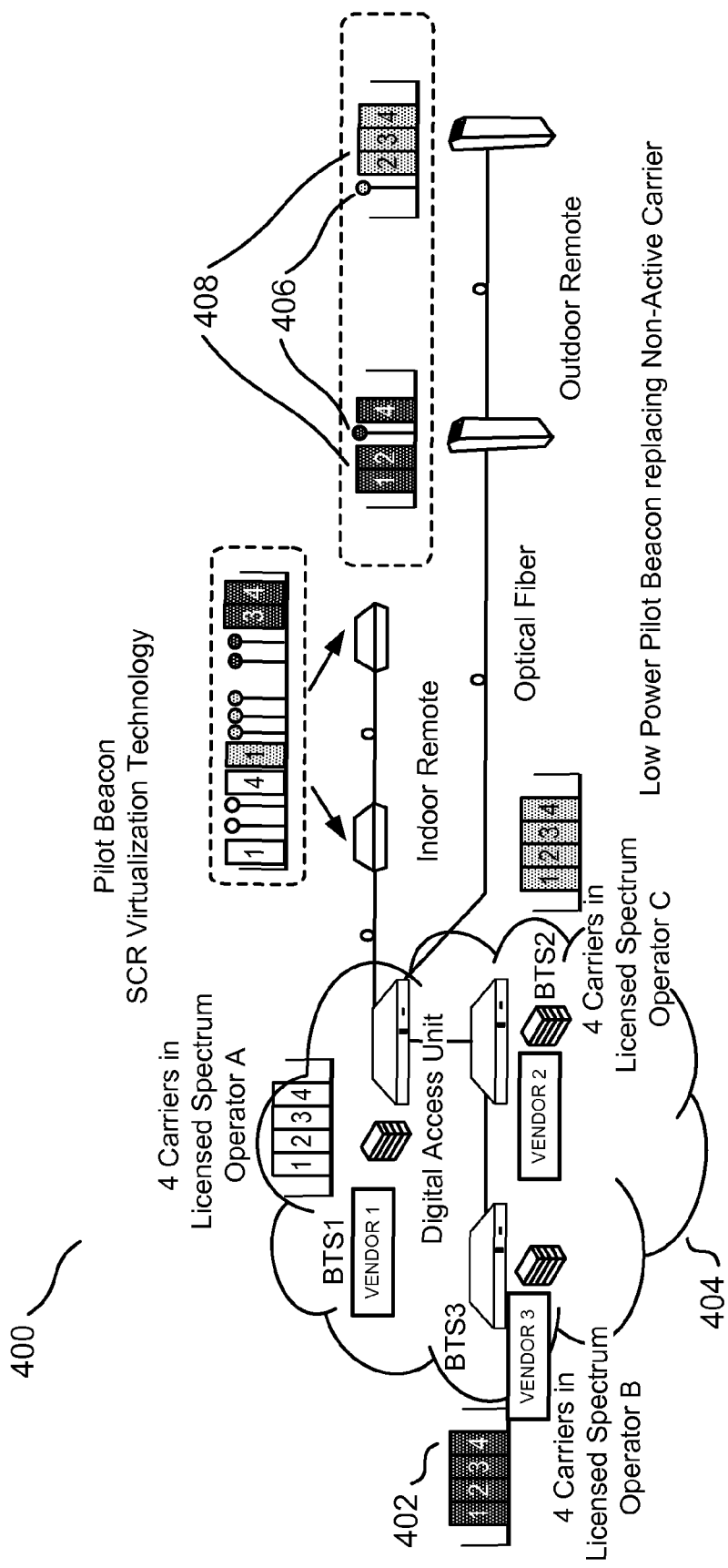
FIG. 4 is a simplified schematic diagram illustrating a virtualized DAS network incorporating pilot beacons according to an embodiment of the present invention.

FIG. 4 is a simplified schematic diagram illustrating a virtualized DAS network 400 incorporating pilot beacons according to an embodiment of the present invention. As illustrated, embodiments of the present invention facilitate intelligent management of a DAS network.

Referring to FIG. 4, the input 402 to the DAUs 404 is provided and can include carriers from multiple operators, which may have BTSs in a base station hotel. The base station output is provided (e.g., fed directly in some embodiments) into the DAU, with suitable attenuation. Once converted to a carrier based digital signal, the traffic can be monitored either on a real time basis or on a calendar basis. Real time monitoring utilizes demodulation of the signal in some implementations. As an example, a football stadium is occupied at known times and the system can be set up to automatically turn off carriers and enable pilot beacons when the stadium is unoccupied. The DAS system 400 illustrated in FIG. 4 can also be set up manually via the element Management system—an SNMP based system that can remotely modify and control the Software Configurable Radios. When automatic load balancing is employed, the system will disable specific carriers as the total load drops below predetermined limits. These limits will typically be based on the maximum number of carriers used by a specific operator, traffic load on those carriers and the QoS (quality of service) defined by the operator. The total number of carriers disabled and the total number of pilot beacons enabled will depend on the traffic load.

Irrespective of how the traffic loading is determined, the DAS system 400 illustrated in FIG. 4 may disable retransmission of the carriers that are lightly loaded and enable transmission of the pilot beacons on these same carriers. Example pilot beacons 406 are shown as sticks with circles in FIG. 4, which are shown to replace slots where carriers 408 may have been. It should be noted that this is not a universal setting in some implementations, but is done on a DRU-by-DRU basis as shown in FIG. 4. By replacing the carriers 408 with pilot beacons 406 (e.g., immediately), full network integrity is maintained including all soft handoff features. Network performance is unaffected. It will be appreciated that this feature is very useful as in many instances, the DAS system will be operating simultaneously outdoors and indoors and traffic conditions will vary by location.

The pilot beacons 406 can be generated internally in the DAU or commercially available third party pilot beacons could also be used. The output from the external pilot beacons would be fed into the DAU as distinct inputs, enabling the complete flexibility to route them to specific Digital Remote Units (DRU) on a time and traffic varying basis.

According to embodiments of the present invention, the net result of managing the pilot beacons can be a significant reduction in the power utilized by the DAS system, e.g. in some instances up to 80%. It should be noted that simply turning off a carrier would result in hard handoffs or dropped calls. By maintaining pilot paging and sync, the system illustrated in FIG. 4 is able to maintain the full feature set of the macro network.

As an example, a sports stadium in an urban area during a football game might have up to six base stations operating on 18 sectors with 4 carriers per sector at a simulcast ratio of 6 to 1. This gives a total of 432 carrier radiating points, where a carrier radiating point is defined as one carrier radiating from one DRU. As an example, in this case, each DRU would be defined as having four radiating points. When the game is over and the stadium is empty, this could be reduced to two base stations with 6 sectors and a single carrier per sector or 36 carrier radiating points. The DAS system would reroute the 6 sectors to an additional 36 radiating points to ensure coverage is maintained. This results in 72 active carrier radiating points. The remaining 360 carrier radiating points would be transmitting only PPS signals. With an average power output of 5 watts per DRU, this would result in a total savings over 5 kilowatts, assuming an RF amplifier efficiency of 20%. In addition, unused base station capacity could be redirected to the macro network. Full hand in and hand out from the stadium would be maintained.

While not specifically discussed herein, DAS system automatic load balancing and network resource optimization are equally applicable to GSM channelized systems. In this case, the channels are rerouted depending on traffic loading and if necessary, the BCCH (Base Control Channel) can be transmitted without voice channels.

In another embodiment, the power supply voltage utilized to drive the power amplifier in the DRU is reduced to a lower power supply voltage as the level of traffic on the network decreases, thereby reducing the power utilized by the system and providing efficiency gains. By decreasing the power supply voltage applied to the power amplifier (e.g., from 28 V to 16 V), the power consumed by the power amplifier is decreased, resulting in efficiency gains. This technique can be used in place of or in combination with the pilot beacon concepts described herein. One of ordinary skill in the art would recognize many variations, modifications, and alternatives.

Figure 5:
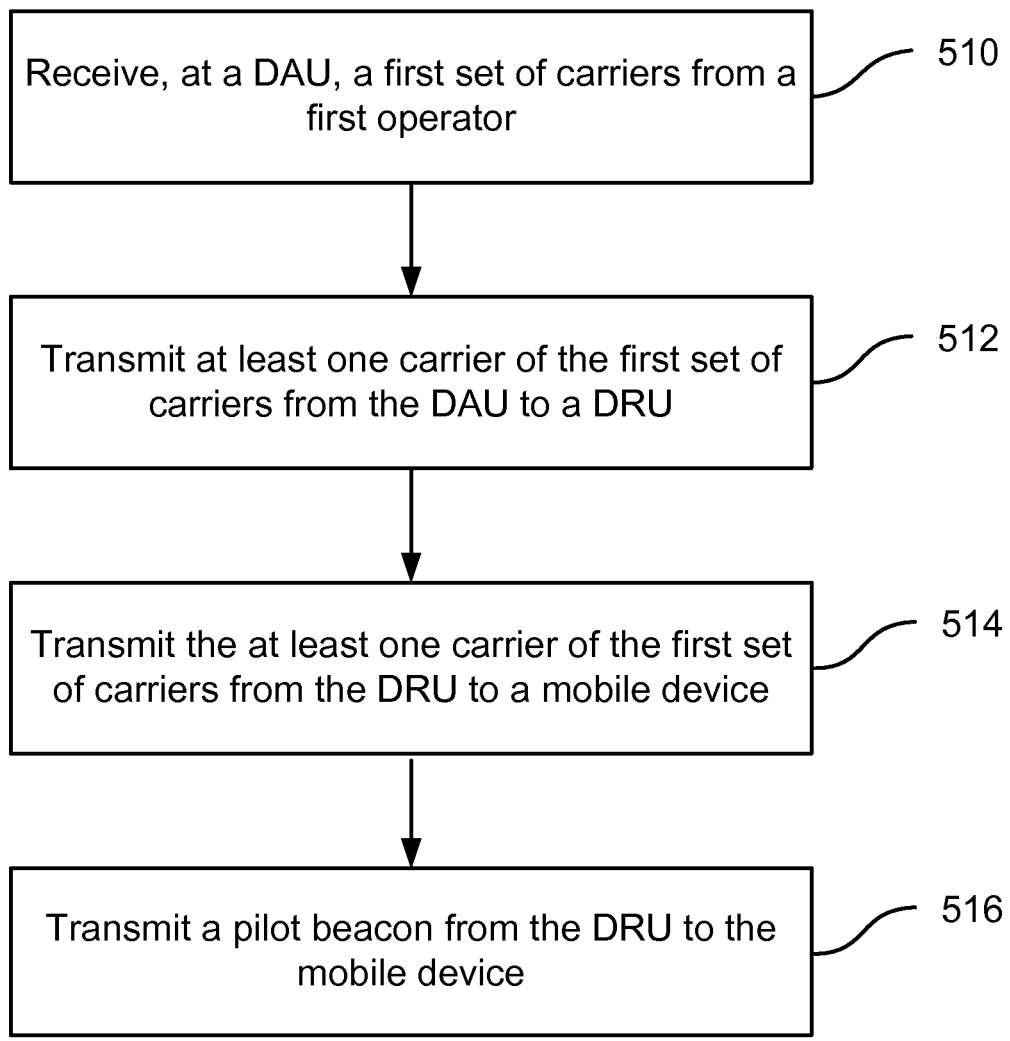
FIG. 5 is a simplified flowchart illustrating a method of operating a virtualized DAS network incorporating pilot beacons according to an embodiment of the present invention.

FIG. 5 is a simplified flowchart illustrating a method of operating a virtualized DAS network incorporating pilot beacons according to an embodiment of the present invention. The method includes receiving, at a DAU, a first set of carriers from a first operator (510). As illustrated in FIG. 4, the first set of carriers can be one of several sets of carriers provided by several different operators. The method also includes transmitting at least one carrier of the first set of carriers from the DAU to a DRU (512).

The method also includes transmitting the at least one carrier of the first set of carriers from the DRU to a mobile device (514) and transmitting a pilot beacon from the DRU to the mobile device. As illustrated in FIG. 4, the pilot beacon replaces a carrier other than the at least one carrier of the first set of carriers, for example, carrier 1 and 4 of Operator A's four carriers are broadcast and carriers 2 and 3 are replaced with pilot beacons. Embodiments of the present invention provide power savings since the pilot beacons are characterized by a lower power than the carriers.

According to another embodiment, the method additionally includes receiving a second set of carriers from a second operator (e.g., four carriers from Operator C), transmitting at least one carrier of the second set of carriers from the DAU to the DRU (e.g., carrier 1 from Operator C), transmitting the at least one carrier of the second set of carriers from the DRU to the mobile device (e.g., carrier 1), and transmitting a second pilot beacon from the DRU to the mobile device (e.g., pilot beacons replacing carriers 2 through 4).

In other embodiments, the method can also include receiving a third set of carriers from a third operator (e.g., Operator B), transmitting at least one carrier of the third set of carriers from the DAU to a second DRU (carriers 1, 2, and 4 to the first outdoor remote), transmitting the at least one carrier of the third set of carriers from the second DRU to the mobile device (carriers 1, 2, and 4 from the first outdoor remote), and transmitting a third pilot beacon from the second DRU to the mobile device (pilot beacon replacing carrier 3).

It should be appreciated that the specific steps illustrated in FIG. 5 provide a particular method of operating a virtualized DAS network incorporating pilot beacons according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6:
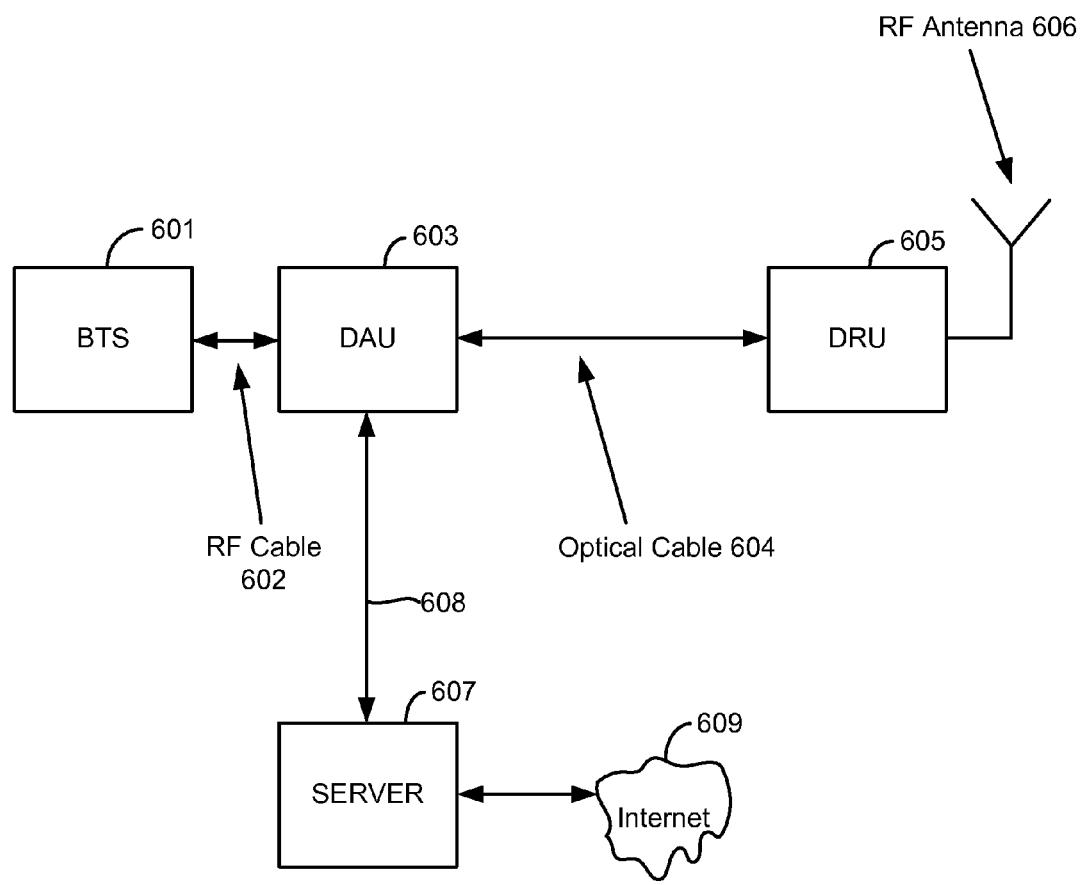
FIG. 6 is a simplified block diagram of a DAU interconnected with a DRU.

Referring to FIG. 6, a DAS network consists of at least one BTS 601, at least one DAU 603 and at least one DRU 605 having at least one RF antenna 606. All the signals passing through the DRU 605 originate at the DAU 603 or are transported to the DAU 603. The BTS 601 may communicate with DAU 603 via RF cable 602. The DAU 603 may communicate with the DRU 605 via an optical cable 604. The DAU 603 may be connected to a server 607 via cable 608 where traffic statistics can be archived. The traffic statistics may then be accessible via the Internet 609. The DAU 603 can monitor the traffic flow to and from the DRU 605.

Figure 7:
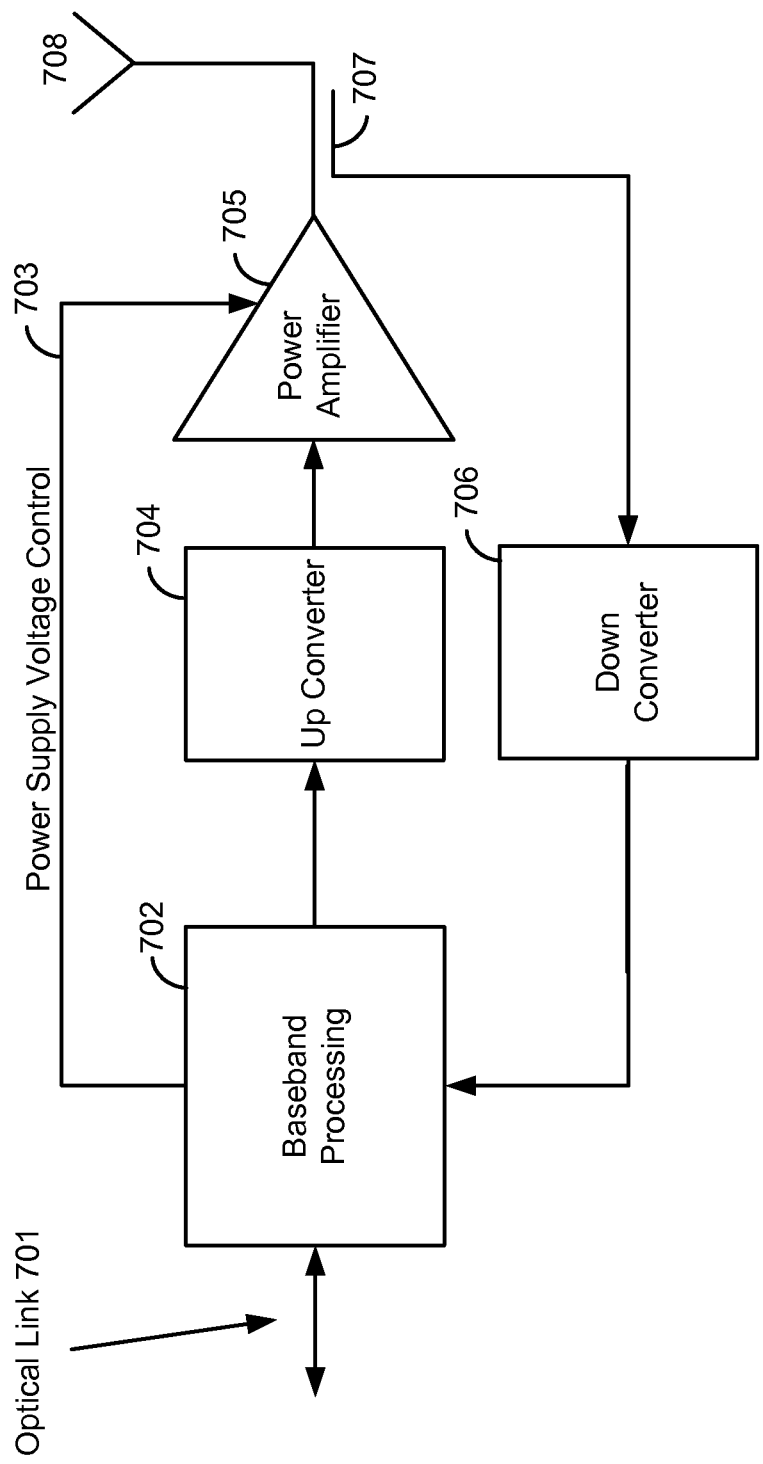
FIG. 7 is a simplified schematic diagram illustrating components of a DRU according to an embodiment of the present invention.

FIG. 7 shows a simplified block diagram of the elements in a DRU, e.g. DRU 605 or any of the DRUs described in FIGS. 1-5. Here, the DRU may include a baseband processing block 702, which may receive signals and perform baseband processing. The processed signals may be passed to up converter module 704, which up converts the signals to prepare to be transmitted via power amplifier 705 through antenna 708 to the target audience. A feedback component 707 of the transmitted signal may be down converted at down converter module 706, which may then be reprocessed in baseband processing block 702. A power supply voltage control 703 may also run from baseband processing block 702 to power amplifier 705 to control the power consumed by the power amplifier 705. In general, the power amplifier 705 consumes the largest amount of DC Power. Reducing the DC power consumed by the power amplifier 705 has a dramatic effect on the power consumed by the DRU. The DAU has access to the traffic flowing through the DRU via optical link 701 and can monitor the level of traffic at the DRU. Based on this information the DAU can command the DRU to reduce the power supply voltage to the power amplifier 705. The reduction in power supply voltage will maintain the operational characteristics of the communication channel between the mobile terminals and the base station while at the same time reducing the power consumed by the DRU. Thus, operating expenses of the DAS network operator may be reduced.

Figure 8:
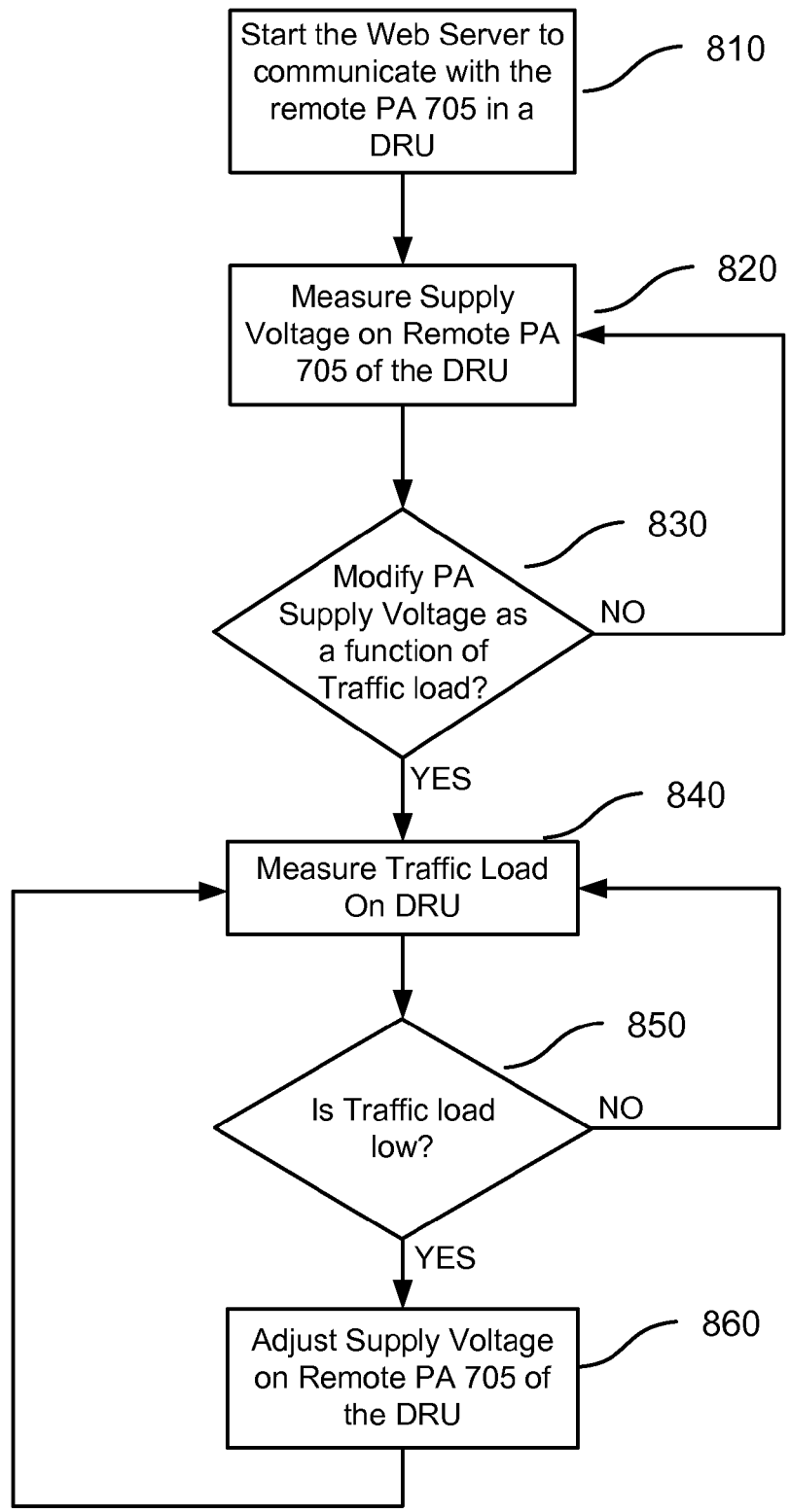
FIG. 8 is a simplified flowchart illustrating method of modifying power supply voltage as a function of network traffic according to an embodiment of the present invention.

FIG. 8 shows the flowchart for the Power amplifier supply voltage control, referencing the descriptions in FIG. 7. The DAU monitors the traffic at the DRU and has the capability to turn on or off the power supply voltage control function. Once the user selects that a traffic dependent supply voltage is desired, then the DAU will have direct control over the supply voltage. In some embodiments, the method may start with a web server communicating with a remote power amplifier (PA) 705 in a DRU, at block 810. At block 820, the supply voltage is measured on the remote PA 705 of the DRU. At block 830, a determination is made whether to modify the PA supply voltage as a function of traffic load. If not, the method loops back to just measuring the supply voltage at block 820. If the PA supply voltage should be modified, then at block 840, the traffic load on the DRU is measured. At block 850, a determination is made whether the traffic load is low. If not, then the traffic load is continued to be monitored at block 840. If traffic load is low, then that may signal that the supply voltage of the remote PA may be reduced, and thus at block 860 the supply voltage is adjusted. The traffic dependent power amplifier supply voltage may be as simple as two or more discrete levels or as complicated as a nonlinear function.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A Distributed Antenna System (DAS) network comprising:
   one or more digital access units (DAUs), wherein each DAU is configured to communicate with a base transceiver station (BTS), and wherein each DAU is configured to convert an analog signal from a BTS into a digital signal that includes one or more carriers;
   one or more digital remote units (DRUs) coupled to the one or more DAUs, wherein each DRU is operable to receive digital signals; and
   a routing table associated with the one or more DAUs, wherein each DAU from the one or more DAUs is configured to use the routing table to route a carrier from the one or more carriers included in a digital signal from a BTS to at least one DRU from the one or more DRUs;
   wherein the DAS network is configured to, for a DRU from the one or more DRUS:
      disable at least one carrier from the one or more carriers included in a digital signal from a BTS; and
      enable pilot beacons in place of each at least one disabled carrier.

2. The DAS network of claim 1 wherein the one or more DAUs comprise a plurality of DAUs, each of the plurality of DAUs coupled to a separate BTS.

3. The DAS network of claim 1 wherein the one or more DRUs comprise a plurality of daisy chained DRUs.

4. The DAS network of claim 1 wherein the one or more DRUs comprise at least an indoor remote unit or an outdoor remote unit.

5. The DAS network of claim 1 wherein a signal provided by a first BTS comprises a first carrier and a second carrier and a signal broadcast by one of the one or more DRUs comprises the first carrier and a pilot beacon in place of the second carrier.

6. The DAS network of claim 5 wherein a second signal provided by a second BTS comprises a third carrier and a fourth carrier and the signal broadcast by the one of the one or more DRUs comprises the third carrier and a second pilot beacon in place of the fourth carrier.

7. A method of operating a Distributed Antenna System (DAS) network, the method comprising:
   receiving, at a DAU, a first set of analog carriers from a first base transceiver station (BTS);
   converting, by the DAU, the first set of analog carriers to a first set of digital carriers;
   transmitting at least one digital carrier of the first set of digital carriers from the DAU to a DRU;
   transmitting the at least one digital carrier of the first set of digital carriers from the DRU to a mobile device;
   disabling at least one digital carrier of the first digital carriers; and
   transmitting pilot beacons from the DRU to the mobile device in place of the disabled at least one digital carrier.

8. The method of claim 7 further comprising transmitting a pilot beacon from the DAU to the DRU.

9. The method of claim 7 wherein a pilot beacon transmitted from the DRU is provided by the DRU.

10. The method of claim 7 further comprising:
    receiving a second set of analog carriers from a second BTS;
    converting the second set of analog carriers into a second set of digital carriers;
    transmitting at least one digital carrier of the second set of digital carriers from the DAU to the DRU;
    transmitting the at least one digital carrier of the second set of digital carriers from the DRU to the mobile device; and
    transmitting a second pilot beacon from the DRU to the mobile device.

11. The method of claim 10 further comprising:
    receiving a third set of digital carriers from a third BTS;
    converting the third set of analog carriers into a third set of digital carriers;
    transmitting at least one digital carrier of the third set of digital carriers from the DAU to a second DRU;
    transmitting the at least one carrier of the third set of carriers from the second DRU to the mobile device; and
    transmitting a third pilot beacon from the second DRU to the mobile device.

12. The method of claim 7 wherein the pilot beacons are characterized by a lower power than the at least one digital carrier.

13. The method of claim 7 wherein a pilot beacon replaces another digital carrier of the first set of digital carriers.

14. The method of claim 7 further comprising reducing a power supply voltage at a power amplifier of the DRU.

15. The method of claim 14 further comprising determining a decrease in a level of network traffic, wherein reducing the power supply voltage is performed in response to the decrease in the level of network traffic.

16. The DAS network of claim 1, wherein each DRU is configured to reduce a power supply voltage at a power amplifier of the DRU.

17. The DAS network of claim 16, wherein each DRU reduces the power supply voltage when a decrease in network traffic is detected.

* * * * *